United States Patent [19]

Morrissy et al.

[11] Patent Number: 4,609,807
[45] Date of Patent: Sep. 2, 1986

[54] APPARATUS AND METHODS FOR LASER SEVERING METAL TUBULAR STOCK

[75] Inventors: James P. Morrissy; William J. Hunter, both of Findlay, Ohio; Herman E. Heidtman, Bay City, Mich.

[73] Assignee: Midwest Laser Systems, Inc., Findlay, Ohio

[21] Appl. No.: 687,284

[22] Filed: Dec. 28, 1984

[51] Int. Cl.⁴ .................. B23K 26/00; B23K 26/06
[52] U.S. Cl. .................. 219/121 LG; 219/121 FS; 219/121 LT; 219/121 LU
[58] Field of Search ............... 219/121 FS, 121 LS, 219/121 LT, 121 LG, 121 LN, 121 LH, 121 L, 121 LU, 121 LV

[56] References Cited

U.S. PATENT DOCUMENTS

| 4,039,799 | 8/1977 | Stumpf | 219/121 LG |
| 4,248,369 | 2/1981 | Clausen | 219/121 LN |
| 4,322,600 | 3/1982 | Crahay | 219/121 LT |
| 4,467,171 | 8/1984 | Ramos | 219/121 FS |

FOREIGN PATENT DOCUMENTS

0193289  11/1982  Japan .................. 219/121 LG

Primary Examiner—M. H. Paschall
Attorney, Agent, or Firm—Learman & McCulloch

[57] ABSTRACT

A system for separating tubular metallic stock into discrete lengths at multiple work stations wherein spindles support and grip tubes and rotate them through a revolution of travel, a laser unit emits a laser beam, a beam bender has a traveling carriage for alternately positioning a reflector to direct the beam toward first one station and then another, and a focusing head receives the beam at each work station. Each focusing head has a lens assembly for directing the beam out an axial convergent nozzle at the rotating stock and focusing it to remove material at the surface of the stock, and a vortexing stream of combustible gas is directed at the rotating stock to enhance the laser vaporizing action which separates the stock into discrete lengths at each station.

7 Claims, 9 Drawing Figures

APPARATUS AND METHODS FOR LASER SEVERING METAL TUBULAR STOCK

This invention relates to the severing of metal pipe stock and more particularly piping of difficult to machine stock such as stainless steel, aluminum, copper and brass tubes.

BACKGROUND OF THE INVENTION

Pipe bending and cutting machinery today conventionally employs single point cutting tools, after any bends are made in the tubular stock, to cut the tubes to the desired length. Since considerable cutting pressures are generated, the stock must be securely gripped and problems have been encountered because the gripping pressures must be gauged so that they will not deform the tube while at the same time the gripping pressures must be such as to securely hold the tube during this essential machining operation. When the tubes are cut, the operation is somewhat time-consuming, because tool wear and the necessity of frequent tool change are complicating factors.

SUMMARY OF THE INVENTION

One of the prime objects of the present invention is to provide a system which requires the tubular stock to be only lightly gripped and which does not deform the stock or waste material by taking a considerable kerf in the severing operation.

Another object of the invention is to provide a system in which the metal removed is vaporized so that scrap removal is not necessary.

Still another object of the invention is to provide a system which is readily adaptable to the separation of tubes of varying diameter and thickness, and does not require the resharpening and replacement of cutting tools.

Another object of the invention is to design a system which severs the tube material without leaving burrs on the edges cut so that a time-consuming and expensive deburring operation becomes necessary.

A further object of the invention is to provide a relatively compact and efficient system which can sever several alternately fed tubes on a time share basis.

Still another object of the invention is to provide a system of the character described in which the separating operation is enhanced by beaming a combustible gas under pressure at the surface being irradiated to greatly enhance the metal vaporization action which occurs.

A still further object of the invention is to provide a system of high reliability and precision in which the lengths severed are within precise tolerance limits.

Other objects and advantages of the invention will be pointed out specifically or will become apparent from the following description when it is considered in conjunction with the appended claims and the accompanying drawings.

Referring now more particularly to the accompanying drawings, the machine includes a frame, generally designated F, comprising an assembly of fabricated bases. A laser, generally designated L, supported on legs 10, braced by cross members 10a, is mounted on a sub-base generally designated 11 which has legs 12 with side rail members 13. The laser L may be a commercially available industrial grade continuous carbon dioxide laser of the type which can be purchased, for example, from Spectra-Physics, Inc. of Mountain View, Calif. Lasers of this type are disclosed in U.S. Pat. Nos. 3,772,610; 3,886,481; 4,058,778 and 4,077,018 which are incorporated herein by reference.

The frame F also includes a machine base 14 for a motor supporting base 15 at one side and a like machine base 14' for supporting a motor base 15' at the other. A control cabinet 16 mounted on legs 17 is provided for the system, as shown. Provided to feed and support the two lengths of pipe P and P' which are to be alternately severed (see FIG. 2), are a series of pairs of rolls 18 and 19 for each of the pipes P and P', forming part of tube feeding and support mechanism of conventional design. The piping which is to be separated into discrete lengths within precise length tolerances, is supported within the nip between rolls 18 and 19 and extends to an end stop plate 20 in the case of pipe P and 20' in the case of pipe P'. End stops 20 and 20' are rotatable members, mounted respectively on spring returned slide rods 21 and 21' which are capable of moving back an increment of travel such as to actuate a limit switch 22 in the case of pipe P, and 23 in the case of pipe P' (both limit switches 22 and 23 being only schematically shown). Each rod 21 or 21' and the limit switch 22 or 23 which it actuates is mounted within a housing 24, fixed to a bracket 24' supported for longitudinal adjustment on slide rods 25. A locking device 26, which may comprise a split block operated by a hand wheel to tighten down on the rods 25 may be used to locate the stop plates 20 and 20' precisely. As shown, rods 25, which support the stops 20 and 20' may be supported by an outboard support member 27 at one end, and by a fabrication mounted on a tubular spindle housing 29 in the case of stop 20 and a tubular spindle housing 29' in the case of stop 20'. Each housing 29 and 29' may be supported on a saddle 30, or a saddle 30', carried by base 15 and 15' respectively.

Also supported on the bases 15 and 15' respectively, are a suitable electric motor M-1 (for revolving pipe P) and M-2 (for revolving pipe P'), each motor M-1 and M-2 having an armature shaft 32 connecting with the input shaft of a gear reducer 33. Each gearbox 33 has an output shaft 34, mounting a pulley 35, which is connected by a belt 36 to a pulley 37 on the spindle 38 which is supported for rotation by spindle housing 29 and spindle 38' which is journaled by spindle housing 29'. The tubular spindle 38, through which the pipe P extends, mounts a pass-through, air operated chuck C-1, which has chuck jaws 40. The tubular spindle 38' likewise mounts pass-through, air operated, chuck C-2 which has chuck jaws 40. The jaws 40 surround the pipes P and P' and are replaceable, dependent upon the diameter of the pipe to be separated.

Figure 1:
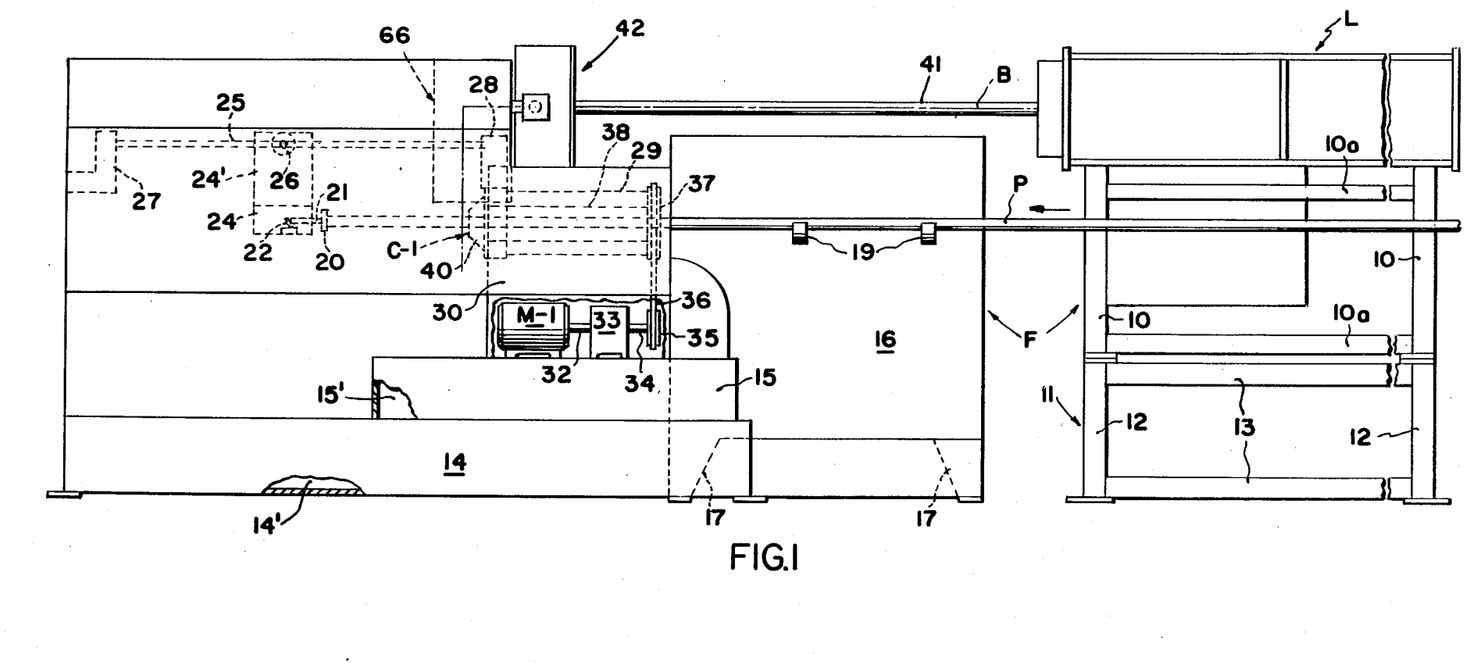
FIG. 1 is a side elevational view of a machine constructed according to the invention.
Figure 2:
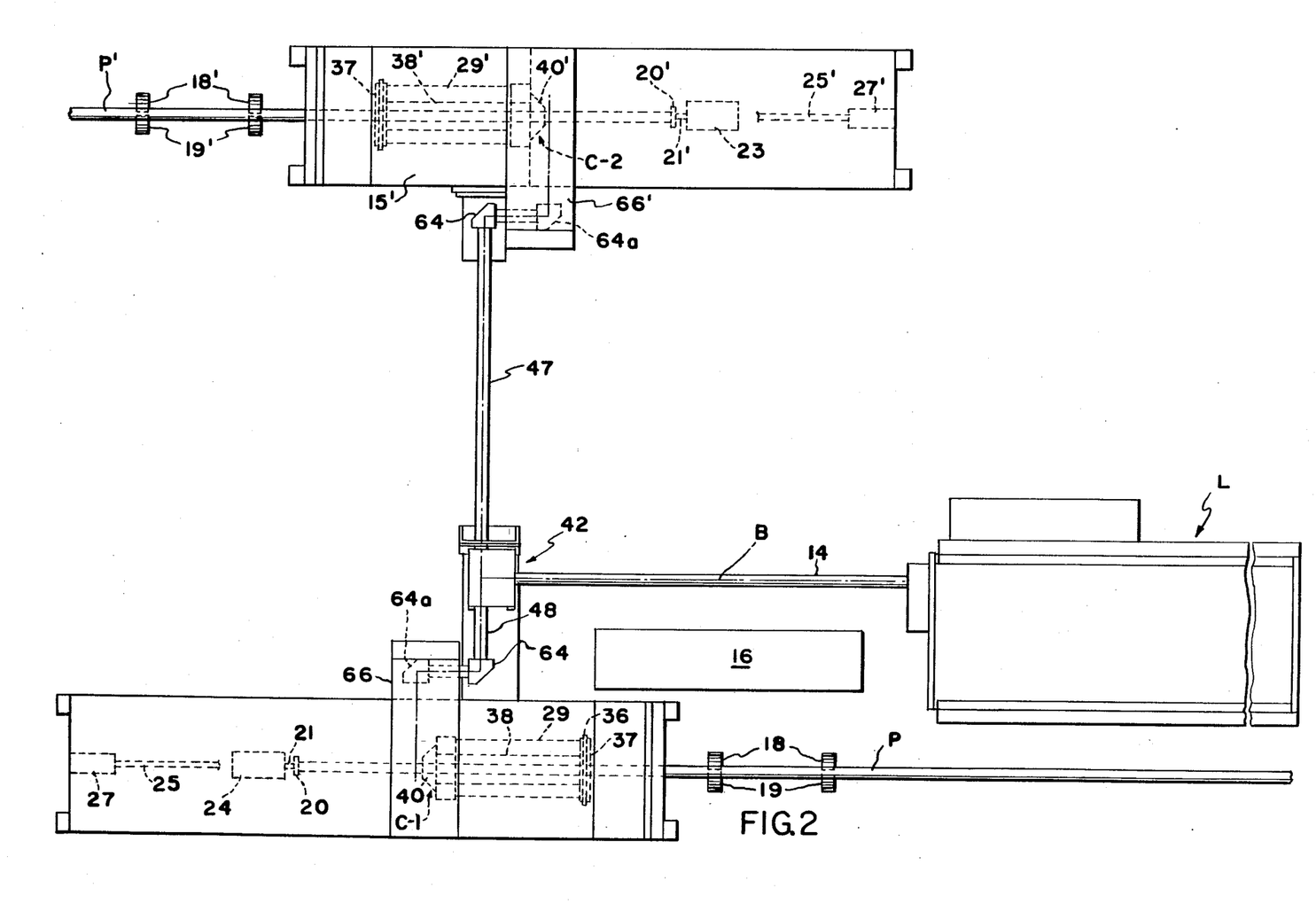
FIG. 2 is a top plan view thereof, illustrating the manner in which a pair of tubes are fed to positions in which sections can be separated from each.

As FIGS. 1 and 2 particularly indicate, the emitted laser beam generally designated B, is surrounded by a metal shielding tube 41. The beam is directed through tube 41 to a time-share beam bending unit, generally designated 42, which alternately reflects the full beam in opposite directions. The unit 42 is more particularly shown in FIGS. 4 and 5.

Figure 4:
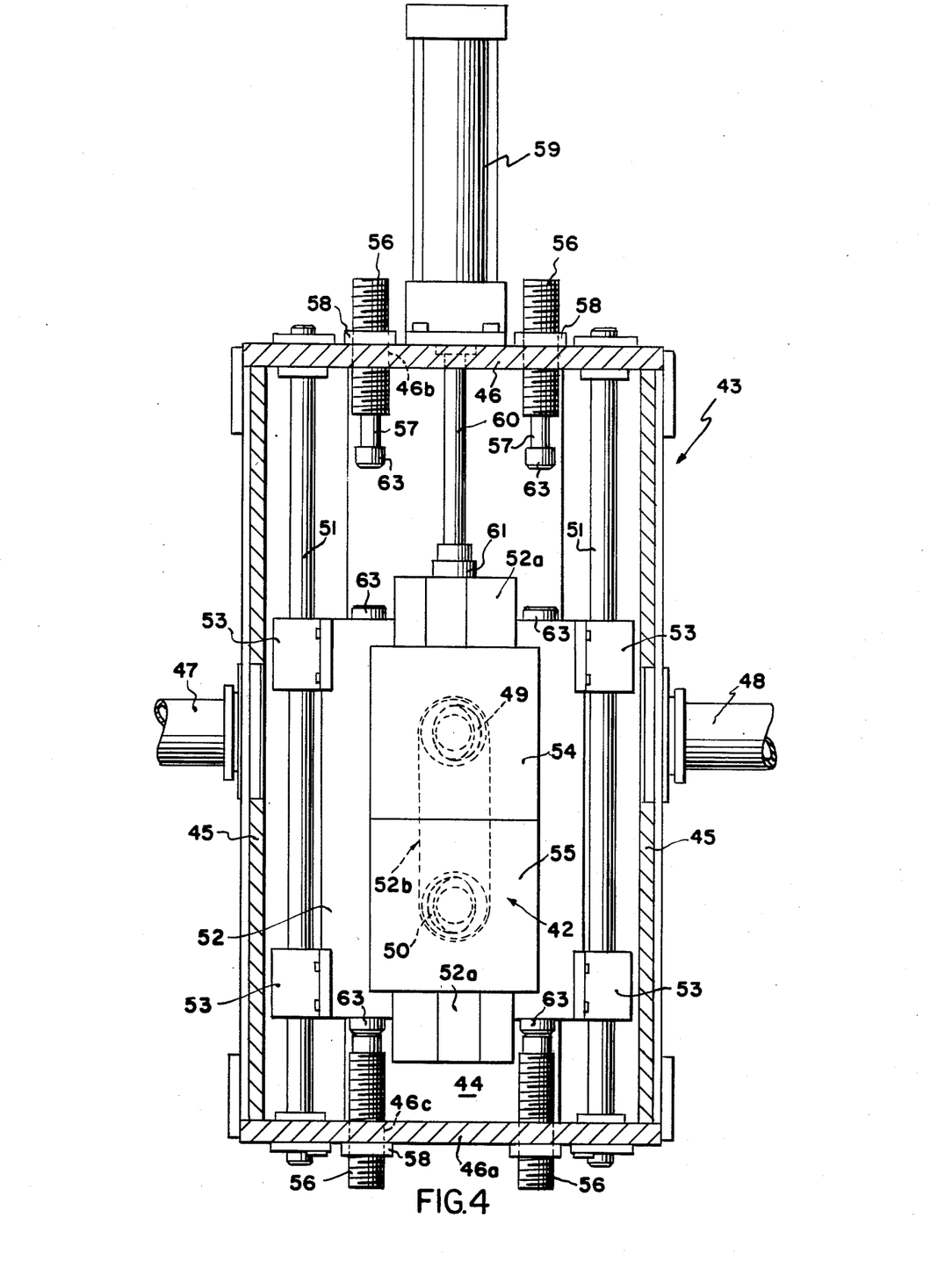
FIG. 4 is an enlarged, sectional, end elevational view of a novel beam splitting unit which is employed, taken on the line 4—4 of FIGS. 2 and 5.
Figure 5:
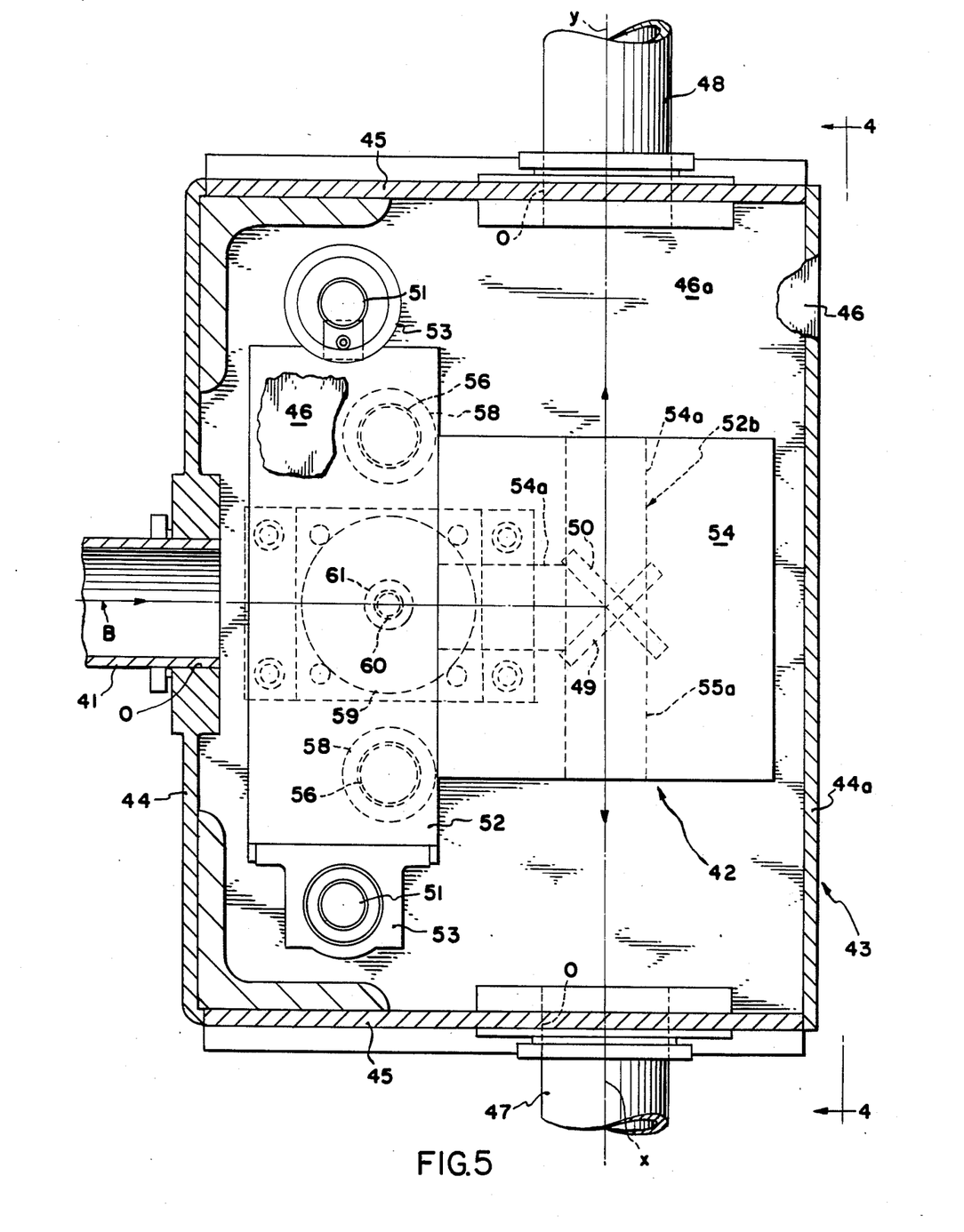
FIG. 5 is a still more enlarged, sectional top plan view thereof.

The unit 42 includes a box-like housing generally designated 43, made up of front and rear plates 44 and 44a, end plates 45, top plate 46, and a bottom plate 46a. Provided in front plate 44, and each of the end plates 45, is an opening O to respectively receive shield tube 41, and beam-shielding tubes 47 and 48. A shiftable upper mirror 49 and lower mirror 50 are mounted within the housing 43 to alternately align with the beam B directed from laser L.

Provided within the housing 43 are a pair of vertical guide rods 51 on which a vertically movable carriage 52, for supporting the cylindrical mirrors 49 and 50, is received for sliding vertical travel. Bearings 53 on carriage 52 mount the carriage 52 for sliding movement. The upper mirror 49 is supported by an upper block 54 and the lower mirror 50 is supported by a lower block 55, both of which are integrated with carriage 52 via pillow blocks 52a and move unitarily therewith. The carriage 52 is provided with an elongate slot 52b to pass the beam B to either of the mirrors 49 or 50, dependent on which is in beam-receiving position, there being openings 54a and 55a provided in blocks 54 and 55 to also pass the beam B to either mirror and to shields 47 and 48 on axes of reflection x and y. The upper and lower walls of the housing 43, are provided with threaded openings 46b and 46c to receive threaded shock absorber casings 56 which have compressible shock absorber pistons 57 as shown cushioned by a fluid medium within cylinders 56. Lock nuts 58 may be provided to releasably secure the shock absorbers 56 in position.

The carriage 52 is powered by a double-acting air cylinder 59 mounted on the housing 43, and having its piston rod 60 coupled, as at 61, to carriage 52. Provided on the carriage 52 are stop buttons 63 which are in axial alignment with the shock absorber rods 57 to stop the carriage 52 in proper position. The purpose of cylinder 59 is to shift the mirrors 49 and 50 alternately to the beam aligned position, and shock absorbers 57 cushion the travel of the vertically moving carriage 52 at either end and locate the mirrors in proper position. The shock absorbers 56 are commercial, fluid-filled assemblies which are available in the marketplace.

Figure 6:
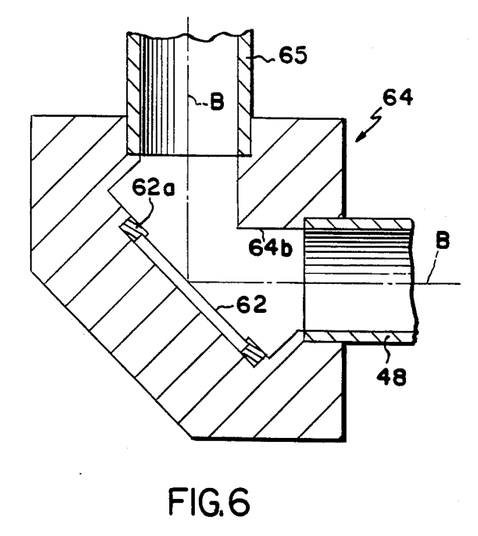
FIG. 6 is an enlarged sectional plan view illustrating a typical beam bending unit.

Provided in the path of the beam diverted through tubes 47 or 48, is a beam bending unit, generally designated respectively 64 and 64'. A typical beam bender 64 or 64' is shown in FIG. 6, wherein a shielding tube 65 is shown as connected to its output end. The units 64 may be simply described as right angle housings having angular passages 64b within which mirrors 62 are mounted in holders 62a, the mirrors being centered such as to reflect the beam received through a 90 degree angle to like beam benders 64a provided in beam focusing assemblies generally designated 66 and 66'.

Figure 3:
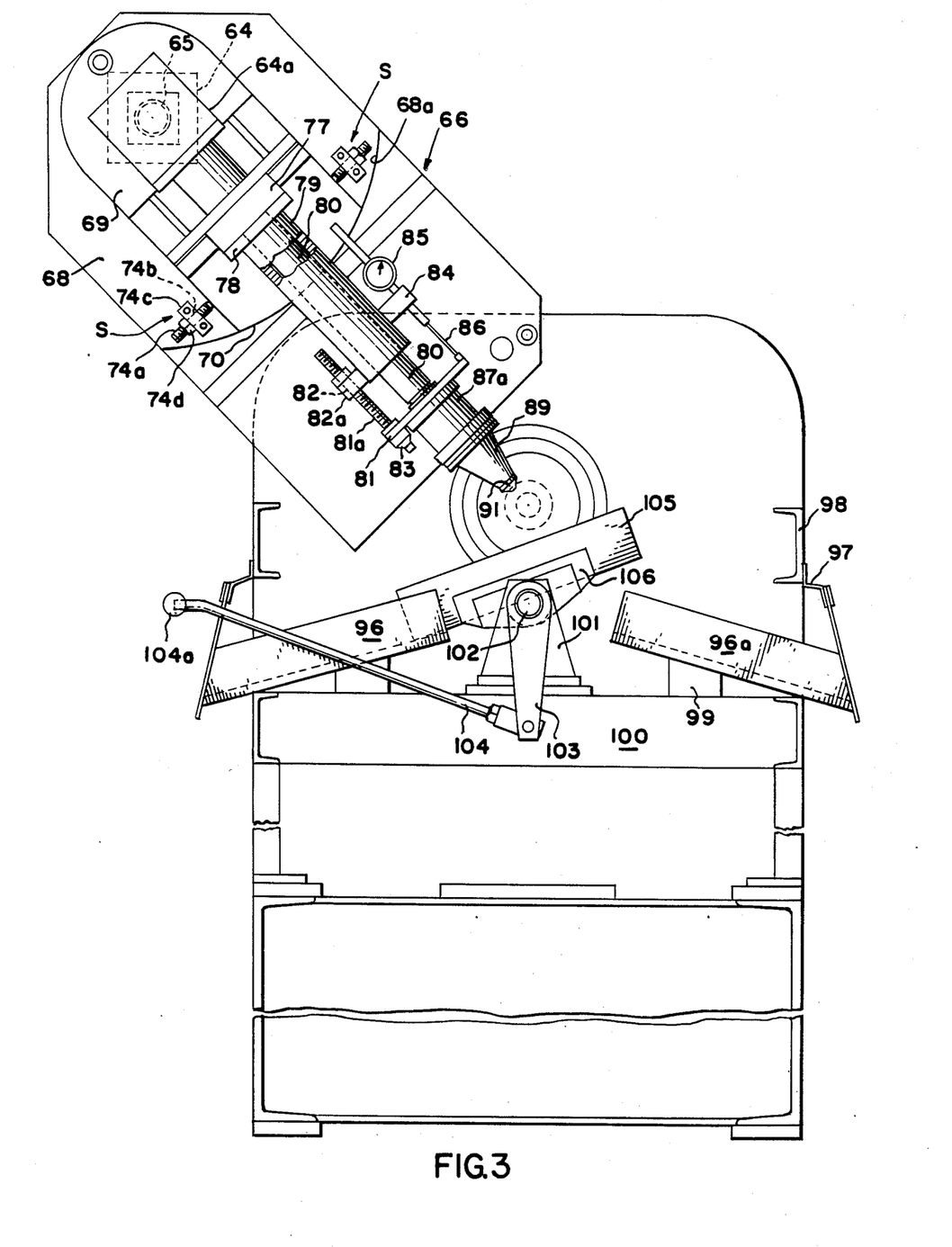
FIG. 3 is an enlarged transverse sectional view particularly illustrating the components of the metal vaporizing head, and a system for removing the separated stock.

As particularly shown in FIG. 2 each focusing head assembly 66 and 66' is supported by a bracket 67 connecting it with a spindle housing 38. The assembly may comprise a base plate 68 (FIGS. 3 and 7) provided with an arcuate recess 68a for receiving a head pivot plate 69, having a complementary arcuate surface 70. The plate 69 of each assembly 66 and 66' is pivotally supported at the axis of the beam shielded by tube 65 by a hollow pivot pin 71 which is threaded as at 72, so as to be received within a threaded opening 68a provided in plate 68. A lock nut 73 may be provided to anchor the hollow pivot pin 71 in position and set screw assemblies S are provided to lock the plate 69 in angular position on plate 68. The assemblies S may comprise threaded studs 74a extending through threaded openings 74b in ears 74c provided on the plate 68, the threaded studs 74a being locked by nuts 74d.

Provided on the plate 69 is an angle bracket fabrication 69a (FIG. 7) which supports the beam bender 64a, and the beam shielding tube 75 which depends from it. The lower end of bracket 69a includes a mount base 75a for supporting the focusing head, generally designed 76, there being a spacer 77 provided between the base flange 78 of the head 76 and flange 75a as shown.

Figure 7:
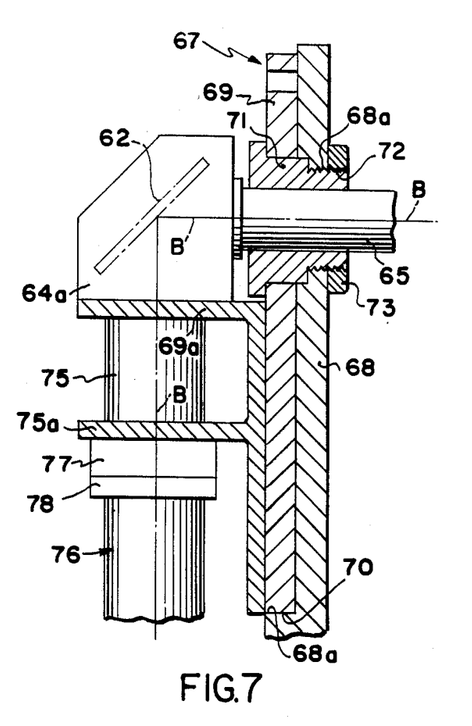
FIG. 7 is an enlarged, fragmentary side elevational view of the upper end of the beam focusing unit.

The focusing head 76 includes a hollow tube 79 within which a telescoping tube 80 is slidably received. Tube 80 has a head plate 81, to which is fixed a micrometer screw 81a which is threadably received as at 82 by a nut 82a carried by the tube 79. A dial adjustment head 83 fixed to the end of screw 81a provides for shifting or telescoping of the rod 80 with turning of the dial head 83. Suitable indicia may be provided on the dial head 83 so that different positions of extent of the tube 80 are indicated.

Provided on an ear 84, also on tube 79, is a dial indicator 85 having a rod extension 86 which bears against the head plate 81 of tube 80. Plainly, incrementally changed positions of the tube 80 will be indicated by the dial of dial indicator 85. Fixed to the inner tube 80, is a finely adjustable hollow lens mount assembly 87 for a lens 88 which focuses the roughly one inch diameter beam such that at the point of focus its diameter is approximately 0.007 of an inch. Secured to the housing 87a which supports lens mount assembly 87, is a conical nozzle 89 which is threaded as at 90 to receive a nose piece 91 having a conical opening 92 leading to an outlet orifice 93 which passes the converged beam.

Figure 8:
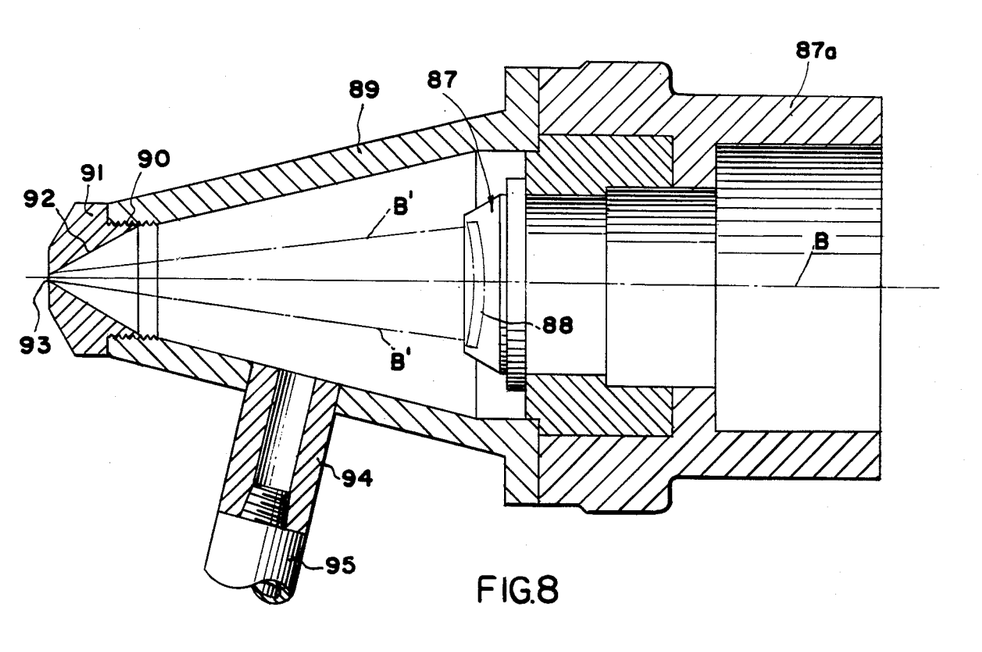
FIG. 8 is an enlarged, fragmentary, sectional view illustrating the nozzle which forms the lower end of the beam focusing and directing unit.

Provided on the side wall of the conical nozzle 89 is an inlet fitting 94 through which oxygen under pressure is delivered from a suitable pipe 95. Typically the oxygen will be under a pressure of 45 p.s.i. and the oxygen will flood the interior of tubular conical housing 89. Nozzle 89 will be sealed from the tube 87a by lens mount 87 or otherwise suitably sealed.

Provided to aid in the discharge of the separated lengths of pipe at the work station provided at each focusing head 66 and 66' so that they alternately discharge from opposite sides of the work station, are a pair of downwardly sloped stationary troughs 96, 96a (FIG. 3), secured to the frame as with brackets 97 via channels 98. Brackets 99 aid in supporting troughs 96 and 96a from a frame mounted channel beam 100. Also mounted on beam 100 is a stand 101 for a pivot pin 102 to which a crank arm 103 is connected. An operating rod 104, having an operating knob 104a is fixed to the end of crank 103 to swing a discharge directing trough 105, supported on a saddle 105 which is fixed to the pivot 102. Plainly, the operator by moving the crank 103 in an arcuate path can position the trough 106 to deliver the tube severed to either the trough section 96, or the trough section 96a, for discharge to a suitable takeaway conveyor.

Figure 9:
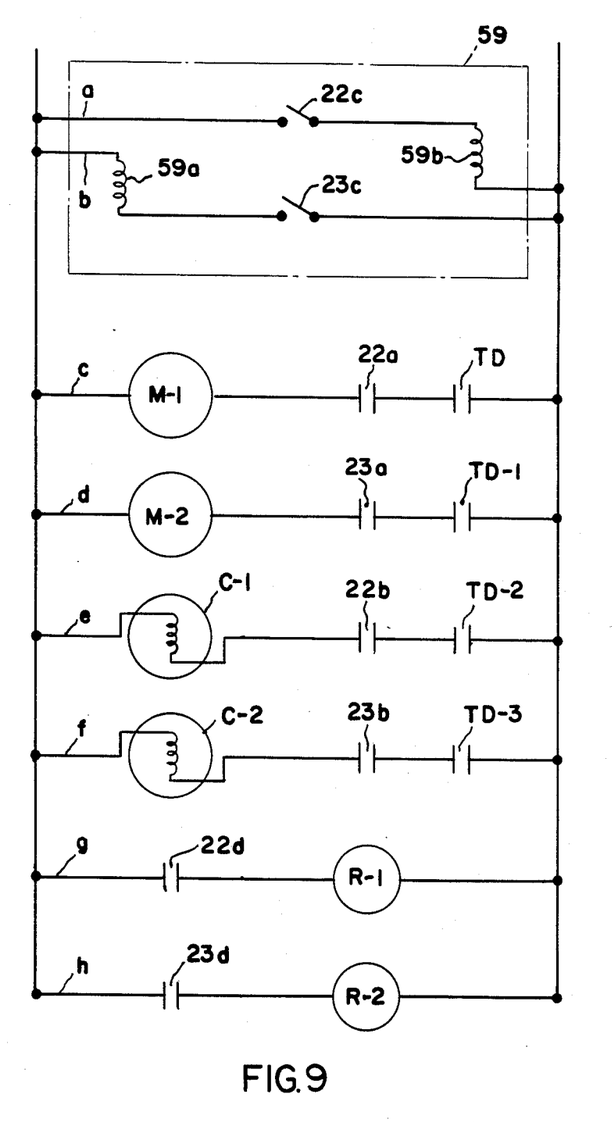
FIG. 9 is a typical schematic electrical control system which may be used.

In FIG. 9, a greatly simplified and schematic electrical control system is portrayed wherein the valve controlling solenoids of cylinder 59 are represented at 59a and 59b. The contacts 22c of switch 22 are in a circuit line a in series with the extend solenoid 59b. The contacts 23c of switch 23 are in a circuit line b in series with a cylinder retract solenoid 59a. The motor M1 for driving spindle 38 is in series in a line c with switch 22, contacts 22a and a time delay switch TD and the motor M-2 for driving the spindle 38' is in a circuit line d in series with the contacts 23a of switch 23 and the time delay switch TD-1.

The solenoid operated clutch C-1 is in a circuit line e in series with switch 22 contacts 22b and time delay contacts TD-2. In a circuit line f, the solenoid operated clutch C-2 for activating the jaws 40' associated with spindle 38' is in series circuit with the switch 23, contacts 23b and time delay contacts TD-3. Switch 22 also has contacts 22d in circuit line g with the relay coil R-1 which controls timer contacts TD and TD-2 and switch 23 has contacts 23d in a series circuit h which also includes the relay coil R-2 for controlling timer contacts TD-1 and TD-3.

The circuit described is only typical of a circuit which could be employed. The timer relays R-1 and R-2 are provided so that cylinder 59 operates to place the mirrors before motor M-1 or M-2 is energized to rotate the stock. During the time that cylinder 59 is operating, the clutch C-1 or C-2 is also operating to grip the pipes P or P', and both the mirror placement and the gripping of the stock occurs before the spindle 38 or 38' is revolved.

THE OPERATION

In operation, and referring now more particularly in the first instance to FIGS. 1 and 2, the two lengths of pipe P and P' to be severed are alternately fed from opposite directions in the direction of the arrows, along the support rollers 18, 19. They feed alternately through the spindle housings 29 and 29' until they engage and depress the stop plates 20 and 20', respectively. At this point, either the limit switch 22 or the limit switch 23 is actuated and the jaws of either of the chucks C-1 or C-2 are activated to lightly grip the pipe P or P'. Assuming carriage 52 has been moved with activation of the switch 22 to the FIG. 4 position and the pipe or tube P is initially gripped by chuck C-1, motor M-1 is energized to drive the spindle 38 and chuck C-1 through a single revolution which revolves pipe P through a single revolution. The laser L is emitting the beam B which is reflected by the mirror 49 of the time shearing beam bender assembly 42 to the focusing head 66, which is aligned to focus on the pipe P. The reflected beam is bent by the beam members 64 and 64a and then finally is focused by lens 88 to converge the beam as indicated at B' in FIG. 8.

The focal point of the beam is chosen such that the focus is about midway of the thickness of the tube or pipe being severed, and the result is that the material of the tube vaporizes along a circumference which may be axially only several thousandths of an inch in thickness.

The vortexing action of the oxygen beam or stream also issuing from the orifice 93 and directed at the surface being irradiated, enhances the vaporizing effect. It tends to keep the surface being irradiated clean and prevents the vaporized material from moving into the assembly to cloud the focusing lens so that the material can instead be removed by the vacuum hood removal system employed with the machine. As soon as a single revolution of pipe P occurs and the severed section drops off into trough 105, the limit switch 22 is deactivated which deenergizes the motor M-1 driving the spindle 38. When the pipe P' is then immediately moved into position to depress stop 20', switch 23 is activated and solenoid 59a is energized to retract piston rod 60 and move carriage 52 upwardly to move the mirror 50 to a position in which is now intercepts the beam B. At the same time, clutch C-2 is energized to grip the tube P'. The beam B is now reflected through shield 48 to focusing head 66' and, with the time delayed energization of motor M-2, the tube P' is rotated through one revolution and focusing head 66' severs it in the same manner. A similar tube discharge system utilizing a shiftable catcher trough 105 may be employed at the work station defined by focusing head 66'. With release of the tube section severed from the pipe P', the spring returned rod 21 restores stop plate 20' and a new pipe P is then fed in immediately to depress stop 20 to commence the next cycle.

With focusing head plate 69 pivotal about the axis of pin 71 in either focusing head 66 or 66', the angular position of the nozzle 89 and the beam is finely tuned to suit the particular diameter of stock and secured in that position by the set screw assemblies S. The mating arcuate surfaces 68a, 70 which are circumscribed from the axis of the pin 71 are important to positively prevent any vibration of the lens 88 relative to plate 68.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a system for separating tubular metallic stock into discrete lengths: a frame; a pair of axially spaced hollow spindles supported horizontally thereon in generally parallel alignment; means on the frame longitudinally aligned with the spindles for horizontally supporting a pair of tubes such that they can be fed axially into position through said spindles to a work station for each tube; jaw means associated with said spindles for gripping said tubes; a laser unit disposed between said work stations for emitting a laser beam; a beam bender assembly comprising a hollow housing with an entrance opening in line with the said beam from the laser unit, and a pair of laterally opposite, side, beam exit openings, said housing containing a carriage mounting a pair of side-by-side carriage mirrors behind said entrance opening and generally broadside to it; guide means mounting said carriage for travel in a back and forth path, to dispose first one of the mirrors and then the other in line with the beam from the laser alternately, said carriage mirrors being tilted in opposite directions to reflect the beam out different exit openings to different work stations dependent upon which mirror is aligned with the entrance opening; carriage moving motor means for moving said carriage in a reciprocatory path to dispose said mirrors to positions alternately opposite the beam to direct the beam out the exit openings alternately toward each work station; motor mechanism for alternately continuously rotating said spindles in a severing path of rotation in correlation with the position of said carriage; each work station having a focusing head with a convergent axially extending nozzle each focusing head having a beam bender for receiving the beam from one of said carriage mirrors and directing the beam axially to the nozzle of each focusing head; and a telescopic lens assembly mounted in each focusing head for directing said beam axially out said nozzle at the rotating stock, and focusing it to remove material at the surface of the stock to separate the stock into discrete lengths.

2. The system of claim 1 wherein said guide means comprises guide rods extending vertically in said housing, said carriage being mounted for travel on said guide rods; said carriage moving motor means comprises a fluid pressure operated cylinder carried by the housing and connected to the carriage for moving the carriage back and forth; and shock absorber members are carried by the housing at its upper and lower ends in the path of said carriage to cushion the travel of the carriage in each direction.

3. The system of claim 1 wherein electrically operated clutches are provided in association with each spindle for gripping the tubes, and each clutch is operated to grip a tube, before the said motor mechanism is operated to rotate the tube gripped.

4. The system of claim 1 wherein a plate secured to the frame is provided for each focusing head, the plate having an arcuate surface circumscribed about the axis of the hollow pivot, the head also having a mating arcuate surface circumscribed about the axis of the hollow pivot in abutment therewith; and means for locking each head in angularly adjusted position relative to one of said plates.

5. The system of claim 1 wherein said focusing head at each work station comprises a housing with a hollow pivot for supporting each head pivotally on the frame in axial alignment with one of said exit openings so that the beam directed out the exit opening passes axially through the hollow pivot; and means is provided for locking the focusing head on the frame at a particular position of pivot of the head relative to the frame.

6. In a system for separating tubular metallic stock into discrete lengths; a frame; spindle means supported thereon; means on the frame longitudinally aligned with the spindle means for supporting tubular stock such that the stock can be fed axially to said spindle means; gripper means associated with said spindle means for gripping said tubes; motor means for rotating said spindle means and thereby said stock; a laser unit emitting a laser beam; a focusing head for receiving said beam including a hollow pivot for supporting the head on the frame in axial alignment with the beam directed to it so that the beam passes axially through the pivot; a convergent nozzle; a beam bender in line with the pivot for directing the beam axially to said nozzle; a telescopic lens assembly for directing said beam axially out said nozzle at the rotating stock, and focusing it to remove material at the surface of the stock to separate the stock into discrete lengths; and means for locking the head on the frame at a particular position of pivot relative to the frame about said hollow pivot.

7. The system of claim 6 wherein said frame includes a base plate provided with a recess having an arcuate marginal wall generated about the said axis of the hollow pivot, said focusing head has a complementary arcuate surface received therein in engagement with said marginal wall, and said locking means includes adjustable means on said base plate on each side of said focusing head for locking said focusing head in a particular position of pivot relative to said frame.

* * * * *